2,809,951

RESINOUS POLYESTER COMPOSITION CONTAINING BENZOGUANAMINE - FORMALDEHYDE RESIN TO PREVENT CRACKING

Andrew A. Varela, Arcadia, Calif., assignor to American Cyanamid Company, New York, N. Y., a corporation of Maine No Drawing. Application May 27, 1953,
Serial No. 357,910

6 Claims. (Cl. 260—39)

This invention relates to a resinous composition suitable for molding purposes. More particularly this invention relates to a resinous composition which may be molded without cracking in thick section moldings.

Many resinous compositions have previously been employed in molding processes. However, a resinous composition suitable for molding intricate electrical pieces such as circuit breaker bases, television tuner boards, grids, capacitors, and the like, has not always been satisfactory. The materials previously available had a tendency to crack in the molds when thick sections were formed.

It is therefore an object of this invention to produce a resinous composition suitable for molding intricate parts which does not crack during the molding operation. It is a further object of this invention to produce an ethylene glycol-fumarate polyester modified with sufficient benzoguanamine-formaldehyde resin to prevent cracking of the molded part during processing. These and other objects of my invention will be discussed more fully hereinbelow.

In the production of the resinous composition of my invention, an ethylene glycol-fumarate polyester is desired inasmuch as it gives a granular, free-flowing, non-tacky molding compound that may be handled in the dry processing methods now employed by the industry. The polyester resin is then modified with a sufficient amount of benzoguanamine-formaldehyde resin to eliminate cracking of the molded object during processing.

The ethylene glycol-fumarate polyester is prepared by reacting ethylene glycol and fumaric acid at an elevated temperature and in an inert atmosphere until an acid number between about 10 and 20 and a viscosity of between about 15 and 75 poises is obtained. I have found that when this low acid number and viscosity range is controlled during the processing of the polyester a suitable molding composition may then be produced therefrom. In order to obtain the desired acid number and viscosity, an inhibitor, as, for example, from about 0.003% to about 0.07% by weight of hydroquinone or ditertiarybutyl hydroquinone, may be added to the initial charge of glycol and acid in the reaction kettle, thus allowing the reaction to proceed to a very low acid number without the usual accompanying steep rise in viscosity.

After the ethylene glycol-fumarate polyester has been prepared, it is then blended in a mixer or ribbon blender with a suitable filler, mold lubricant, catalyst and the benzoguanamine-formaldehyde resin to form the molding composition. Suitable fillers are clay, asbestos, glass fiber, alpha cellulose, and the like. A mold lubricant such as zinc stearate is suitable for addition to the mixture. Catalysts such as benzoyl peroxide are also added to the formulation. This formulation may also contain a cross-linking agent such as diallyl phthalate, but this is not necessary to insure a suitable molding composition.

The benzoguanamine-formaldehyde resin used as the modifier for the polyester resin is prepared as follows:

184 parts of benzoguanamine and 162 parts of formalin (37% aqueous formaldehyde) are charged into a suitable reaction vessel and the pH of the mixture is adjusted to about 6.4 with sodium hydroxide. The mixture is heated to reflux and held at this temperature until the mass becomes hydrophobic. The mass is then partially cooled to about 80° C. and the pH is again adjusted with sodium hydroxide to about 8.5, at which point the resinous mass is then vacuum concentrated.

The ratio of formaldehyde to benzoguanamine in the resin may vary from about 1:1 to 4:1 mols of formaldehyde per mol of benzoguanamine. It is preferred, however, that from about 2:1 to 3:1 mols of formaldehyde per mol of benzoguanamine be utilized.

I have found that the resinous composition of my invention should contain from about 30% to about 33% by weight of modified ethylene glycol-fumarate polyester and from about 67% to about 70% by weight of a filler for optimum molding properties. The filler employed may contain from about 50% to about 95% by weight of clay and correspondingly from about 10% to about 50% by weight of asbestos and/or from about 5% to about 50% by weight of glass fibers. The amount of benzoguanamine-formaldehyde resin employed may vary from about 1% to about 10% by weight based on the total weight of the modified polyester. In order to show the improved results obtained by my invention, the following table is set forth for purposes of illustration. An electrical outlet was molded and examined after extraction from the mold as set forth in the table, in which all percentages are based on the total weight of the molding composition, using a filler composed of clay and asbestos in a 70:30 weight ratio, respectively.

| Total Resin, Percent | Modifier, Percent | Filler, Percent | Cure at 310° F., Sec. | Flexural Strength, p. s. i. | Product |
|---|---|---|---|---|---|
| 33 | None | 67 | 20 | 7,800 | Cracked |
| 33 | 1.65 | 67 | 14 | 9,500 | OK |
| 31 | 3.1 | 69 | 15 | 7,700 | OK |
| 31 | 1.55 | 69 | 13 | 8,400 | OK |

I claim:

1. A resinous composition suitable for molding which comprises an ethylene glycol-fumaric acid polyester, a filler and sufficient benzoguanamine-formaldehyde resin to prevent cracking of the molding during cure of said composition.

2. A resinous composition suitable for molding which comprises from about 30% to about 33% by weight of modified ethylene-glycol-fumaric acid polyester and from about 67% to 70% by weight of a filler, the weight of the polyester and filler being based on the total weight of the composition, said polyester being modified with from about 1% to about 10% by weight of a benzoguanamine-formaldehyde resin based on the weight of said polyester.

3. A resinous composition suitable for molding which comprises from about 30% to about 33% by weight of modified ethylene-glycol-fumaric acid polyester and from about 67% to about 70% by weight of a filler, wherein the filler comprises from about 50% to about 90% by weight of clay and from about 10% to about 50% by weight of asbestos, the weight of the polyester and the filler being based on the total weight of the composition, said polyester being modified with from about 1% to about 10% by weight of a benzoguanamine-formaldehyde resin based on the weight of said polyester.

4. A resinous composition suitable for molding which comprises from about 30% to about 33% by weight of modified ethylene-glycol-fumaric acid polyester and from about 67% to about 70% by weight of a filler, wherein the filler comprises from about 50% to about 95% by weight of clay and from about 5% to about 50% by weight of glass fibers, the weight of the polyester and the filler being based on the total weight of the composition, said polyester being modified with from about 1% to about 10% by weight of a benzoguanamine-formaldehyde resin based on the weight of said polyester.

5. A resinous composition suitable for molding which comprises about 33% by weight of modified ethylene glycol-fumaric acid polyester and about 67% of a filler wherein said filler comprises about 70% by weight of clay and about 30% by weight of asbestos, the weight of the polyester and the filler being based on the total weight of the composition said polyester being modified with about 5% by weight of a benzoguanamine-formaldehyde resin based on the weight of said polyester.

6. A resinous composition suitable for molding which comprises about 33% by weight of modified ethylene-glycol-fumaric acid polyester and about 67% of a filler wherein said filler comprises about 50% by weight of clay and about 50% by weight of glass fibers, the weight of the polyester and the filler being based on the total weight of the composition said polyester being modified with about 5% by weight of a benzoguanamine-formaldehyde resin based on the weight of said polyester.

References Cited in the file of this patent

UNITED STATES PATENTS 2,642,409    Cordier _____ June 16, 1953